(12) United States Patent
Kries et al.

(10) Patent No.: US 7,475,872 B2
(45) Date of Patent: Jan. 13, 2009

(54) HYDRAULIC ENGINE MOUNT WITH CENTER-CLAMPED DECOUPLER

(75) Inventors: Jack R. Kries, Lebanon, OH (US);
Ronald A. Beer, Fairborn, OH (US);
James P. Hamberg, Tipp City, OH (US);
Fredrick C. Miller, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 1056 days.

(21) Appl. No.: 10/092,320

(22) Filed: Mar. 6, 2002

(65) Prior Publication Data
US 2003/0168789 A1   Sep. 11, 2003

(51) Int. Cl.
*F16F 9/10* (2006.01)

(52) U.S. Cl. .................................. 267/140.13; 267/219

(58) Field of Classification Search ............ 267/140.14, 267/140.15, 140.11, 140.13, 219
See application file for complete search history.

(56) References Cited

U.S. PATENT DOCUMENTS

| | | | |
|---|---|---|---|
| 4,588,173 A | 5/1986 | Gold et al. | |
| 4,621,795 A * | 11/1986 | Eberhard et al. | 267/140.13 |
| 4,726,573 A | 2/1988 | Hamaekers et al. | |
| 4,765,601 A | 8/1988 | Miller et al. | |
| 4,938,463 A * | 7/1990 | Miyamoto | 267/140.13 |
| 4,986,510 A * | 1/1991 | Bellamy et al. | 267/140.13 |
| 5,104,100 A * | 4/1992 | Simuttis | 267/140.13 |
| 5,273,262 A | 12/1993 | Baldini et al. | |
| 5,443,245 A * | 8/1995 | Bellamy et al. | 267/140.13 |
| 5,516,084 A | 5/1996 | Rizzo | |
| 5,707,047 A | 1/1998 | Meyering et al. | |
| 5,782,462 A | 7/1998 | Hein et al. | |
| 6,241,223 B1 | 6/2001 | Gugsch et al. | |
| 6,250,615 B1 | 6/2001 | Leibach | |
| 6,425,575 B1 * | 7/2002 | Takashima et al. | 267/140.13 |
| 6,505,822 B1 * | 1/2003 | Yamamoto et al. | 267/140.13 |
| 6,536,113 B2 * | 3/2003 | Guillemot | 267/140.13 |

FOREIGN PATENT DOCUMENTS

| | | | |
|---|---|---|---|
| JP | 62228726 A | * | 10/1987 |
| JP | 05248485 A | * | 9/1993 |
| JP | 06307489 A | * | 11/1994 |

\* cited by examiner

*Primary Examiner*—Thomas J Williams
(74) *Attorney, Agent, or Firm*—Thomas N. Twomey

(57) ABSTRACT

A powertrain mount comprises an upper orifice plate, a lower orifice plate, and a generally planar diaphragm having an enlarged central node. The central node is in constant contact with the upper orifice plate and in contact with the lower orifice plate. A periphery of the diaphragm is free to move between the upper orifice plate and the lower orifice plate.

19 Claims, 1 Drawing Sheet

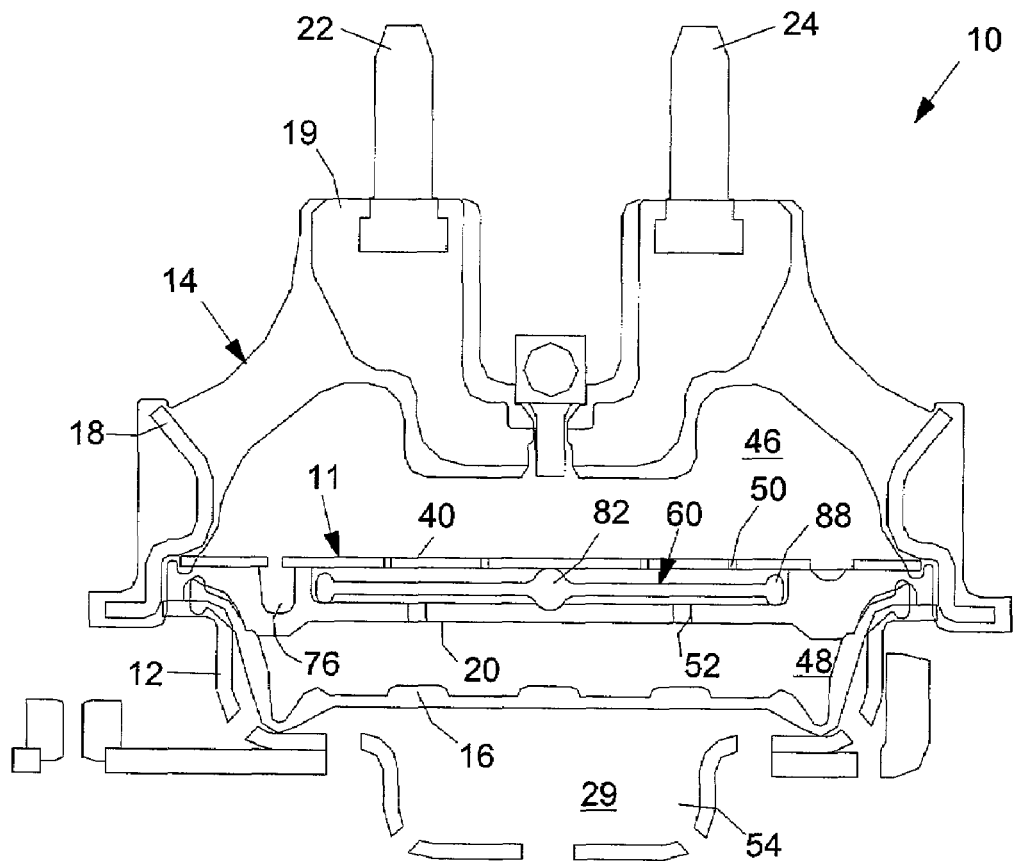

HYDRAULIC ENGINE MOUNT WITH CENTER-CLAMPED DECOUPLER

TECHNICAL FIELD OF THE INVENTION

This invention relates to powertrain mounts for motor vehicles, and more particularly to a powertrain mount having a compliant element in the fluid chamber.

BACKGROUND OF THE INVENTION

It is desirable to provide motor vehicles with improved operating smoothness by damping and/or isolating powertrain vibrations of the vehicle. A variety of mount assemblies are presently available to inhibit such engine and transmission vibrations. Many of these mount assemblies combine the advantageous properties of elastomeric materials with hydraulic fluids. A hydraulic mount assembly of this type typically includes a reinforced, hollow rubber body that is closed by a resilient diaphragm so as to form a cavity. This cavity is separated into two chambers by a plate. The chambers are in fluid communication through a relatively large central orifice in the plate. The first or primary chamber is formed between the partition plate and the body. The secondary chamber is formed between the plate and the diaphragm.

A decoupler may be positioned in the central passage of the plate to reciprocate in response to the vibrations. The decoupler movement alone accommodates small volume changes in the two chambers. When, for example, the decoupler moves in a direction toward the diaphragm, the volume of the portion of the decoupler cavity in the primary chamber increases and the volume of the portion in the secondary chamber correspondingly decreases, and vice-versa. In this way, for certain small vibratory amplitudes and generally higher frequencies, fluid flow between the chambers is substantially avoided and undesirable hydraulic damping is eliminated. In effect, this decoupler is a passive tuning device. Diaphragm-type decouplers are also known. U.S. Pat. No. 5,516,084, which is hereby incorporated by reference, shows a hydraulic engine mount with a diaphragm decoupler.

In addition to the relatively large central passage, an orifice track with a smaller passage may be provided extending around the perimeter of the orifice plate. Each end of the track has an opening; one opening communicating with the primary chamber and the other with the secondary chamber. The orifice track provides the hydraulic mount assembly with another passive tuning component, and when combined with the decoupler, provides at least three distinct dynamic operating modes. The particular operating mode is primarily determined by the flow of fluid between the two chambers.

More specifically, small amplitude vibrating input, such as from relatively smooth engine idling or the like, produces no damping due to the action of the decoupler, as explained above. In contrast, large amplitude vibrating inputs, such as large suspension inputs, force the decoupler against either mating plate to stop volume compensation and to produce fluid flow through the orifice track, and an accordingly high level of damping force and desirable control and smoothing action. Conventionally decoupled hydraulic mounts have certain drawbacks. When the decoupler closes against one of the partition's plates, noise referred to as "chortle" or "loose lumber" is created.

SUMMARY OF THE INVENTION

The present invention is a powertrain mount comprising an upper orifice plate, a lower orifice plate, and a generally planar diaphragm having an enlarged central node. The central node is in constant contact with the upper orifice plate and in contact with the lower orifice plate. A periphery of the diaphragm is free to move between the upper orifice plate and the lower orifice plate.

Accordingly, it is an object of the present invention to provide an improved hydraulic mount overcoming the limitations and disadvantages of the prior art.

Another object of the present invention is to provide a hydraulic mount of the type described above which minimizes audible noise emitted from the mount during large amplitude inputs.

Still another object of the present invention is to provide an improved hydraulic mount of the type described above which maintains a relatively low dynamic rate at engine idle.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 is a cross-sectional view of a powertrain mount according to the present invention for a motor vehicle; and FIG. 2 is a top view of an orifice plate of the mount.

DETAILED DESCRIPTION OF THE PRESENTLY PREFERRED EMBODIMENT

FIG. 1 shows an improved hydraulic mount 10 according to the present invention that is particularly adapted for mounting an internal combustion engine and/or transmission to a frame in a vehicle. Mount 10 includes a partition assembly 11, an elastomeric molding assembly 14, and inserts 18 and 19. Fasteners 22 and 24 serve as mounting points wherein the molding assembly provides a mounting member for the mount 10. The molding assembly 14 is adapted for crimped assembly onto a base plate 12, which provides a second mounting member for mount 10. The base plate 12 may also include fasteners for mounting purposes. The molding assembly 14 and the base plate 12 are configured such that they essentially completely define a hollow cavity 29. A chamber diaphragm 16 engages molding assembly 14 and spans across cavity 29. The chamber diaphragm 16 is formed of an elastomeric such as natural or synthetic rubber.

The partition assembly 11 includes an upper orifice plate 40, an elastomeric diaphragm 60, and a lower orifice plate 20. During assembly, the periphery of the partition assembly 11 is sandwiched between the base plate 12 and the insert 18, which are subsequently crimped together to secure the assembly. When the mount 10 is assembled, the cavity 29 is divided by the partition assembly 11 into chambers 46 and 48. The chamber diaphragm 16 separates chamber 48 from space 54. Primary or pumping chamber 46 is enclosed between the molding assembly 14 and the partition assembly 11. Secondary chamber 48 is enclosed between the chamber diaphragm 16 and the partition assembly 11. Prior to closure of the cavity 29 at assembly, the primary and secondary chambers 46 and 48 are filled with a liquid such as a glycol-based solution. Chamber diaphragm 16 prevents fluid leakage from chambers 46 and 48 to the space 54.

FIG. 2 shows the upper orifice plate 40, through which extend a plurality of relatively small, circular openings 50. A similar, though not necessarily matching series of openings 52 are formed through the lower orifice plate 20. An inertia track 76 extends around the perimeter of the lower orifice plate 20, from a port 78 which opens into the primary chamber 46 to an exit port 80 which opens to the secondary chamber 48. The diaphragm 60 is adapted to be captured between upper orifice plate 40 and lower orifice plate 20. In particular, the diaphragm 60 includes an enlarged central node 82 that is held in contact with the orifice plates 20 and 40. In a preferred embodiment, the node 82 is constrained and/or compressed between the orifice plates 20 and 40. The diaphragm 60 also includes a raised rim portion 88 that is free to move, with the remainder of the diaphragm other than the node 82, during operation.

Liquid in the primary chamber 46 is forced to flow through the upper orifice openings 50, or through inertia track 76, into the secondary chamber 48 upon compression of the primary chamber 46 and in the opposite direction on expansion thereof to provide a damping effect. Limited volume exchange in the chambers 46 and 48 to effect hydraulic decoupling (elimination of the hydraulic damping and hydraulic spring rate) below a prescribed low amplitude, generally at high frequencies, is provided by resilient movement of the diaphragm 60 in response to alternating pressure build-ups in the mount 10 acting on the opposite sides of the partition assembly 11. For larger mount displacements caused by high amplitude vibrations, the fluid flow forces the diaphragm 60 to move far enough to bottom out on either orifice plate 20 or 40. When the diaphragm 60 bottoms out, the compression of either the primary or secondary chamber can no longer be compensated by volume exchange and fluid flow is forced to move through the inertia track 76. This results in a large increase in the mount's dynamic rigidity. Hydraulic damping is thereby provided for high vibratory amplitudes at low frequencies.

As the mount 10 is cycled at large displacements, the chortle noise that had been conventionally produced thereby is minimized. The node 82 provides stiffness to the diaphragm, and the raised rim 88 minimizes the contact area of the diaphragm to the orifice plates, thereby minimizing any noise that would occur during large amplitude inputs. In addition, the mount 10 has improved high frequency dynamic rate characteristics over floating decouplers due to the added decoupler stiffness of clamping the decoupler mass at the center.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A powertrain mount comprising:
   an upper orifice plate;
   a lower orifice plate; and
   a generally flat and planar diaphragm having an enlarged central node and a periphery spaced apart from the central node, the central node having a continuous curvature and being disposed generally entirely at a central portion of the diaphragm, wherein the central node is in constant contact with the upper orifice plate and in contact with the lower orifice plate, and wherein the periphery is spaced apart from at least one of the upper or lower orifice plates and free to move between the upper orifice plate and the lower orifice plate.

2. The powertrain mount of claim 1 wherein the upper orifice plate includes a plurality of holes through which fluid may flow.

3. The powertrain mount of claim 2 wherein the holes have a generally circular cross-section.

4. The powertrain mount of claim 1 wherein the lower orifice plate includes a plurality of holes through which fluid may flow.

5. The powertrain mount of claim 4 wherein the holes have a generally circular cross-section.

6. The powertrain mount of claim 1 wherein the periphery of the diaphragm includes a raised rim.

7. The powertrain mount of claim 1 wherein the upper and lower orifice plates define an orifice track.

8. A powertrain mount comprising:
   an upper orifice plate;
   a lower orifice plate; and
   a generally flat and planar diaphragm including an enlarged and substantially spherical central node and a periphery spaced apart from the central node, the central node having a continuous curvature and being disposed generally entirely at a central portion of the diaphragm, wherein the central node is in constant contact with the upper orifice plate and in contact with the lower orifice plate, and wherein the periphery includes a raised rim that is spaced apart from at least one of the upper or lower orifice plates and free to move between the upper orifice plate and the lower orifice plate.

9. The powertrain mount of claim 8 wherein the upper orifice plate includes a plurality of holes through which fluid may flow.

10. The powertrain mount of claim 9 wherein the holes have a generally circular cross-section.

11. The powertrain mount of claim 8 wherein the lower orifice plate includes a plurality of holes through which fluid may flow.

12. The powertrain mount of claim 11 wherein the holes have a generally circular cross-section.

13. The powertrain mount of claim 8 wherein the upper and lower orifice plates define an orifice track.

14. A powertrain mount comprising:
   an upper orifice plate having a plurality of holes through which fluid may flow;
   a lower orifice plate having a plurality of holes through which fluid may flow; and
   a generally flat and planar diaphragm having an enlarged and substantially spherical central node and a periphery spaced apart from the central node, the central node having a continuous curvature and being disposed generally entirely at a central portion of the diaphragm, wherein the central node is in constant contact with the upper orifice plate and in contact with the lower orifice plate, and wherein the periphery is spaced apart from at least one of the upper or lower orifice plates and free to move between the upper orifice plate and the lower orifice plate.

15. The powertrain mount of claim 14 wherein the holes in the upper orifice plate have a generally circular cross-section.

16. The powertrain mount of claim 14 wherein the holes in the lower orifice plate have a generally circular cross-section.

17. The powertrain mount of claim 14 wherein the periphery of the diaphragm includes a raised rim.

18. The powertrain mount of claim 14 wherein the upper and lower orifice plates define an orifice track.

19. The powertrain mount of claim 1 wherein the central node is substantially spherical in shape.

* * * * *